United States Patent [19]

Caillet et al.

[11] Patent Number: 5,107,090
[45] Date of Patent: Apr. 21, 1992

[54] WELDING HEAD

[75] Inventors: René Caillet, Voiron; Christian Clerc, St. Julien De Ratz, both of France

[73] Assignee: Conception et Fabrication D'Innovations Mecaniques Confirm, Voiron, France

[21] Appl. No.: 540,608

[22] Filed: Jun. 19, 1990

[30] Foreign Application Priority Data

Jun. 19, 1989 [FR] France .................. 89 08734

[51] Int. Cl.⁵ .............................................. B23K 9/12
[52] U.S. Cl. ............................. 219/60 A; 219/124.03
[58] Field of Search .......... 219/60 A, 125.11, 124.03, 219/124.02

[56] References Cited

U.S. PATENT DOCUMENTS 4,372,474  2/1983  Taff .................... 219/60 A

Primary Examiner—Clifford C. Shaw
Attorney, Agent, or Firm—Browdy and Neimark

[57] ABSTRACT

A clamp intended for the end-to-end welding of two tubes disposed in accordance with an axis (3) by an electrode (14) operating in a circular movement (18) includes two collars (1, 2), mounted pivotably around the axis (3), put into rotation by gears (7, 8, 10, 11). On one collar (1) a swinging element (13) is pivotably mounted and used to support the welding electrode (14). A cam (16) is provided on the other collar (2), which cooperates with an integral element (15) of the swinging element (13). The two collars are put in motion by two distinct motors which are connected with regulation and control devices which permit a change of the rotation speed of at least one of the collars in such a way that the distance between the electrode (14) and the axis (3) is changed. In this way the height of the arc is controlled.

6 Claims, 2 Drawing Sheets

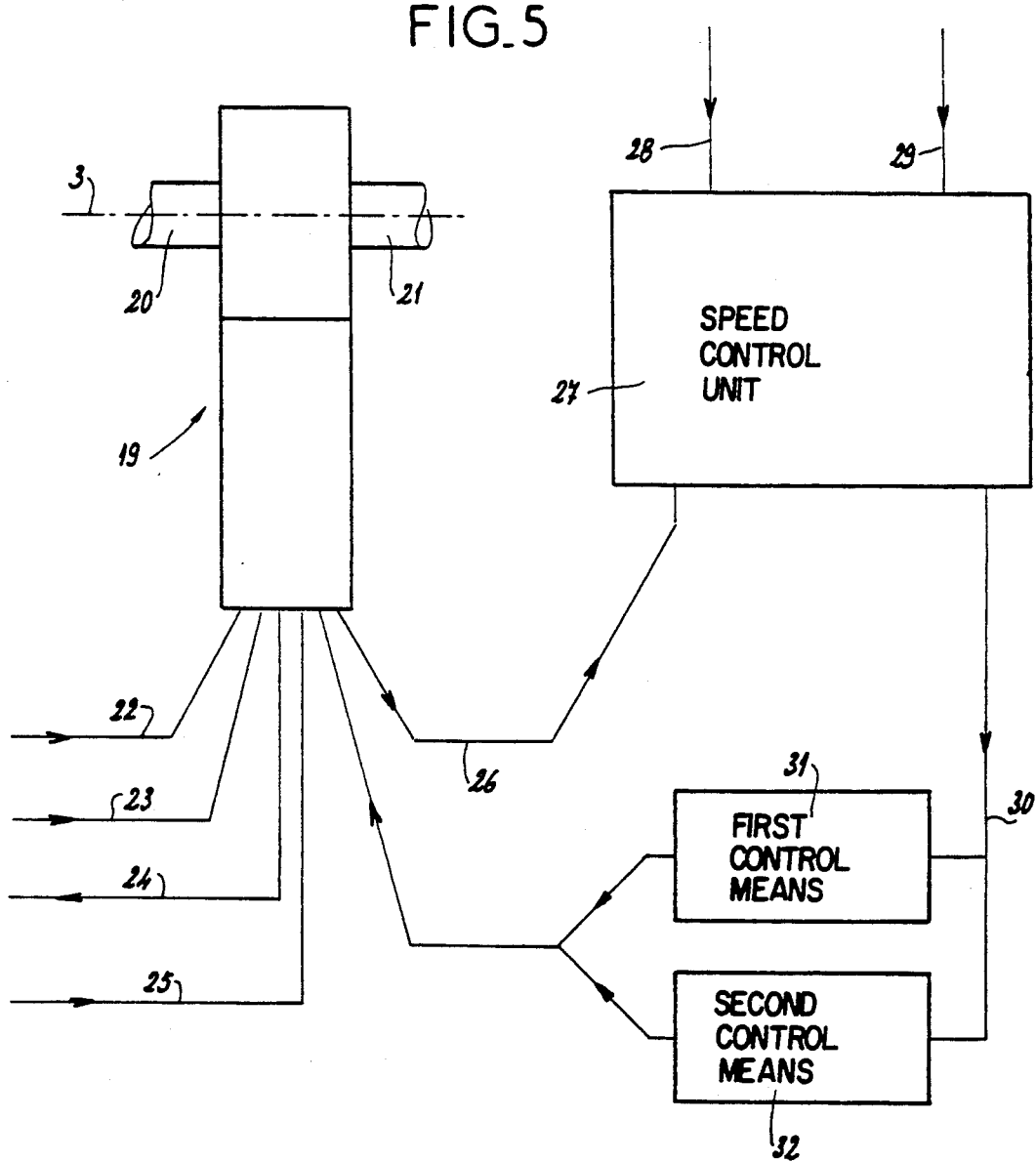

WELDING HEAD

FIELD OF THE INVENTION

The present invention relates to a welding head particularly intended for performing end-to-end welding of two tubes disposed on the same axis. More particularly, this head utilizes a welding electrode of the "TIG" type (tungsten inert gas), which performs a circular movement around the axis, and it may be a part of a fixed welding bed or of a portable material.

BACKGROUND OF THE INVENTION

There actually are orbital welding heads with arc control, as well as welding heads. The existing welding clamps do not have arc control. The result is that in cases where the tubes to be welded are more or less irregular, in particular oval, the height of the arc varies during the course of the rotation of the electrode around the tubes, which is performed in accordance with a circular trajectory.

SUMMARY OF THE INVENTION

It is an object of the present invention to remedy these disadvantages by providing an improved welding head which, while preserving a simple construction, allows the adaptation of the position and trajectory of the welding electrode, more particularly with a view to controlling the height of the arc, for example by keeping such height of the arc constant in case the tubes to be welded are oval.

To this end the welding head of the present invention essentially comprises in combination: a first collar and a second collar mounted in a rotating manner around the axis of the pieces to be welded, first rotation generating means for rotating the first collar second rotation-generating means distinct from the first rotation means for rotating the second collar into rotation, a swinging element mounted oscillatingly on the first collar and serving as a support for the welding electrode, cam forming means provided on the second collar and cooperating with an integral element of the swinging element, and regulating and control means connected with the rotation-generating means of the two collars for allowing the changing of the rotation speed of at least one of the collars so as to cause a controlled radial displacement of the welding electrode by changing the angular position between the two collars and the action of the cam on the swinging element.

The regulating and control means are provided, for example, to put the first collar into rotation at a constant speed, and to put the second collar into a variable rotation speed higher or lower than that of the first collar; also the second collar is provided with an advance or retardation in regard to the first collar, which allows a change of the distance of the welding electrode to the axis of the clamp, in order to assign to the electrode a circular trajectory with a larger or lesser radius.

In connection with a particular embodiment of this welding head, the swinging element pivotably mounted on the first rotating collar and used as support for the welding electrode is provided with a dog point turned towards the second collar, while The second collar comprises, in addition to the cam forming means, a preferably inwardly bent groove in which one end of the dog point is slidingly mounted.

Each rotating collar advantageously has exterior toothing in contact with the driving gears coupled with the respective motors, at least one of which is intended to operate at a variable speed under the control of the previously mentioned regulating and control means.

In accordance with one embodiment, each rotating collar has a recess, giving it the shape of a letter C and making it possible to bring pieces to be welded in and remove them laterally, two synchronized driving gears being associated with each collar in accordance with a disposition such that the exterior toothing of each collar is always in contact with at least one of the two corresponding driving gears.

The welding head in accordance with the invention can also comprise detectors for the rotation speed of the collars and/or the height of the arc, connected with the regulating and control means associated with the rotation generating means for the two collars in such a way as to be able to detect every variation in the height of the arc in the course of the movement of the welding electrode and to cause an immediate correction of this arc height so as to keep it constant in case of an irregularity in the shape of the pieces to be welded such as is the result of the tubes to be welded being oval.

In this way a welding head having a well regulated height of the arc is achieved by means of a principle of differential speed. It should be understood that in case of tubes with perfectly circular sections the two collars can also be put into rotation at identical speeds in order to impart a perfectly circular trajectory to the welding electrode.

BRIEF DESCRIPTION OF THE DRAWINGS

At any rate, the invention will be better understood with the aid of the following description, making reference to the attached schematic drawings representing by way of non-limiting example an embodiment of this welding clamp.

FIG. 5 is a block diagram showing the control and regulating elements associated with this welding head.

DETAILED DESCRIPTION OF THE DRAWINGS

Figure 1:
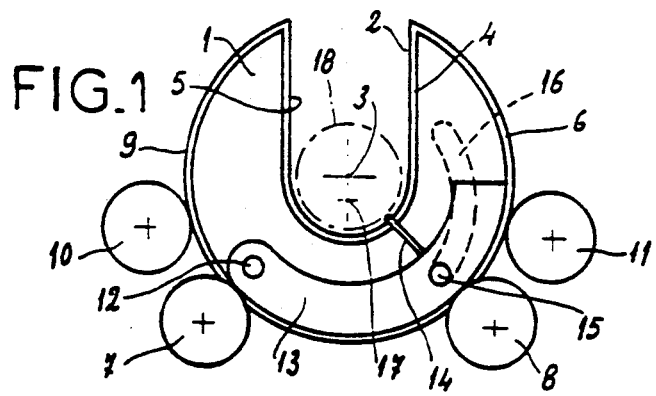
FIG. 1 is a front view of the welding clamp in accordance with the present invention in a particular position.

The welding head shown in the drawings comprises two collars 1 and 2, rotatingly mounted on the same central axis 3, which coaxial to the geometric axis of the tubes to be welded. Each collar 1 and 2 has a large recess 4 and 5, respectively, which gives it the form of a letter "C" and thus making lateral passage and removal of work-pieces possible, at least into the relative position shown in FIG. 1 where the two recesses 4 and 5 are brought into congruence.

The first collar 1 has an exterior toothing 6, which is in contact with one of at least two synchronized, angularly offset driving gears 7 and 8. Similarly, the second collar 2 having exterior toothing 9 is driven by gears 10 and 11. These gears are themselves connected by means of other gears of transmission means with electric motors, not shown, a first motor being connected with the first collar 1 and a second motor being connected with the second collar 2. The banked position makes it possible for the toothing 6 or 9 of each collar 1 or 2 to be always in contact with at least one of the two corresponding driving gears, either 7, 8 or 10, 11, in spite of the break in these toothings on account of the recesses 4 and 5. In this way, each collar 1 or 2 can be rotatingly driven continuously around the axis 3 by the motor with which it is connected.

A swinging element 13 with an inwardly bent shape is pivotably mounted on the first rotating collar 1 on a pivot shaft 12 parallel to the central axis 3. The swinging element 13 supports a welding electrode 14, turning on the axis 3. Also fixed on the swinging element 13 is a dog point 15, turned towards the second collar 2. One end of the dog point 15 is slidably mounted on an inwardly bent groove 16 cut from the second collar 2, the groove 16 not being centered on the axis 3 and thus being able to form a circular arc centered on a point 17 (see FIG. 1) located outside of the axis 3.

It is to be understood that the position of the dog point 15 is fixed in the groove 16 by a given relative angular position of the two collars 1 and 2, and determines the distance between the welding electrode 14 and the central axis 3. If the two collars 1 and 2 are put simultaneously into a rotating movement at the same speed, their relative position remains constant and the end of the welding electrode 14 describes a perfectly circular trajectory 18 centered on the axis 3.

More particularly, in the relative position of the two collars 1 and 2 shown in FIG. 1, the dog point 15 is located at a first end of the groove 16 and at that time the electrode 14 describes a trajectory 18 with the maximum radius.

Figure 2:
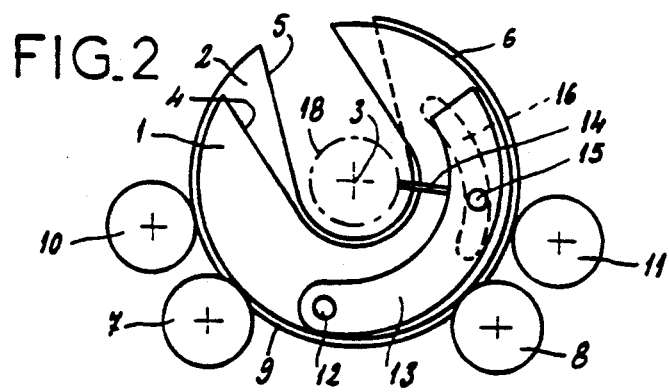
FIGS. 2, 3 and 4 are views similar to that of FIG. 1 and illustrating other positions of this welding head.
Figure 3:
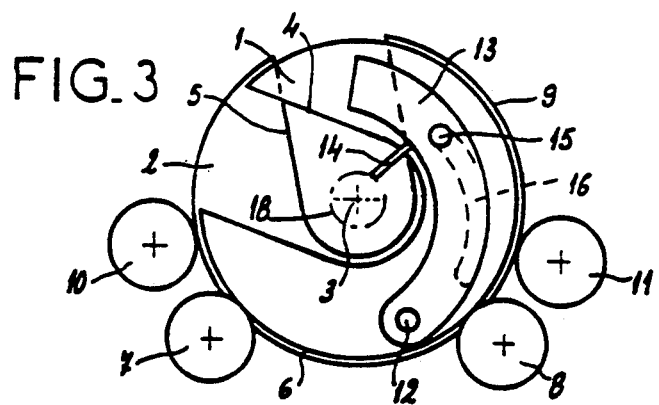
Figure 4:
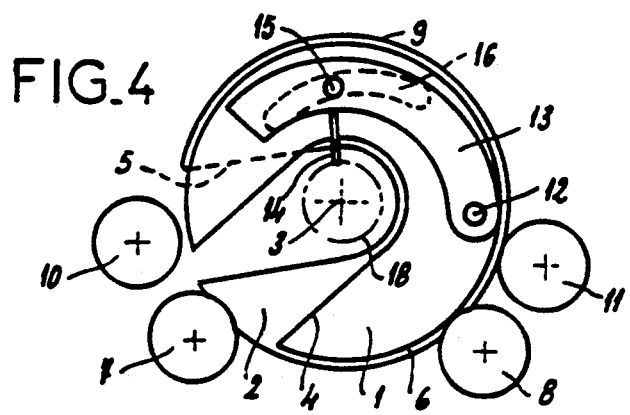

Other positions are illustrated by FIGS. 2 to 4. In the case shown in FIG. 2, the dog point 15 takes up a certain intermediate position in the groove 16, so that the end of the electrode 14 describes a trajectory 18 of an intermediate, but relatively large, radius. In the case of FIG. 3, the dog point 15 is located at the second end of the groove 16 and the end of the electrode 14 15 describes a trajectory 18 of a minimal radius. FIG. 4 indicates another intermediate position by means of which the end of the electrode 14 describes a trajectory 18 of an intermediate, but relatively small, radius. Because of this construction there are also an infinite number of other intermediate positions, therefore a possibility of a continuous change of the radius of the trajectory 18 between the maximum and minimum values defined above.

It follows from the above that by changing the speed of rotation of at least one of the two collars 1 and 2, it is possible at any moment to change the distance between the end of the welding electrode 14 and the central axis 3. By way of example and quite schematically, FIG. 5 shows a regulating and control arrangement connected with the welding head 19, which allows the regulation of the distance between the end of the electrode and the axis 3 in accordance with which the two tubes 20 and 21 to be welded are disposed in respect to each other, so as to maintain a constant height of the arc.

The welding head 19, which may be of the "TIG" type (tungsten inert gas), comprises an electrical connection 22 to a welding pole, a water supply 23, a water return 24 and a gas admission line 25. Speed and height sensors furnish representative signals, which are transmitted by a link 26 to an electronic management and speed control unit 27, which also receives a reference signal of the rotation speed and a reference signal of the arc height at 28 and 29, respectively. The output 30 of the electronic unit 27 is linked with first control means 31 for the electric drive motor of the first collar 1 and with a second control means 32 for the electric drive motor of the second collar 2.

The principle used for regulation may consist of maintaining the speed of the first collar 1 constant and varying the speed of the second collar 2 to "more" or "less" in respect to the speed of the first collar 1 in order to obtain, as needed, an advance or a retardation of the second collar with respect to the first one (the reverse obviously being possible).

If the welding speed is increased or diminished and if the electronic speed control unit 27 associated with the tw sensors shows an arc height other than the one programmed as reference value, the control intervenes to adjust (positively or negatively) the deviation of the arc height. The height of the arc is thus corrected by variation of the speed.

If the welding speed is constant and if a difference of the arc height is detected by the sensors and the electronic unit 27, such as is particularly the case when the tubes 20 and 21 are of oval shape, a command is transmitted through the output 30 to speed up or slow down the collar 2 in respect to the collar 1 in such a way as to correct immediately the observed change of the height of the arc.

It should be understood that the invention is not limited to the single embodiment of this welding head described above by way of example; on the contrary, it includes all variations in respect to the same principle; in the same way, there is no departure from the spirit of the invention when the two collars in the shape of a letter "C" are replaced by collars in the shape of complete rings, in the case of a welding head provided with an axial, and not lateral, feeding and removal of tubes or other pieces to be welded.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A welding head particularly intended for performing end-to-end welding of two tubes (20, 21) disposed on the same axis (3) and utilizing a welding electrode (14) which performs a circular movement (18) around said same axis (3), comprising in combination: a first collar (1) and a second collar (2) mounted in a rotating manner around said same axis (3) of the pieces to be welded, first rotation generating means (6, 7, 8) for rotating said first collar (1), a second rotation generating means generally (9, 10, 11) distinct from said first rotation generating means for rotating said second collar (2), a swinging element (13) rotatably mounted on said first collar (1) and serving as a support for said welding electrode (14), cam forming means (16) provided on the second collar (2) and cooperating with an integral element (15) of the swinging element (13) to produce rotation of said swinging element, and regulating and control means respectively connected with said first and second rotation-generating means (6 to 11) of said first collar and second collar for effecting a controlled radial displacement of said welding electrode

(14) by changing the angular position between said first collar and said second collar and the action of said cam (16) on said swinging element (13).

2. A welding head in accordance with claim 1, comprising regulation and control means (26 to 32) for rotating said first collar (1) into rotation at a constant speed, and for rotating said second collar (2) at a variable speed which is higher or lower than that of said first collar (1).

3. A welding head in accordance with claim 2, wherein each said first collar and second collar respectively have exterior toothing (6, 9) in contact with driving gears (7, 8, 10, 11) coupled with respective motors, at least one of which is able to operate at a variable speed under the control of said regulating and control means (26 to 32).

4. A welding head in accordance with claim 3, wherein each said first and second collar (1, 2) have a recess (4, 5) giving it the shape of a letter "C" and making it possible to laterally bring in and remove workpieces to be welded (20, 21), two synchronized driving gears of said driving gears (7, 8, 10, 11) being associated with said first and said second collar (1, 2) in accordance with a disposition such that said exterior toothing (6, 9) always is in contact with at least one of two corresponding said driving gears (7, 8, 10, 11).

5. A welding head in accordance with claim 2, further comprising detection means for determining at least one of the rotation speeds of said first collar and said second collar and the height of the arc connected with the regulating and control (26 to 32) means associated with said first and second rotation generating means, in such a way as to be able to detect every variation in the height of the arc in the course of the movement of the welding electrode (14) and to cause an immediate correction of this arc height and keeping it constant in case of an irregularity in the shape of the pieces to be welded such as is the result of the tubes (20, 21) to be welded being oval.

6. A welding head in accordance with claim 1 wherein said swinging element (13), pivotably mounted on said first rotating collar (1) and used to support said welding electrode (14), is provided with a dog point (15) tunnel towards said second collar (2), said second collar (2) comprising, an inwardly bent groove (16) in which one end of said dog point (15) is slidingly mounted.

* * * * *